United States Patent
Gaertner et al.

(10) Patent No.: US 9,441,737 B2
(45) Date of Patent: Sep. 13, 2016

(54) VALVE, IN PARTICULAR OUTLET VALVE OF A HYDRAULIC PISTON PUMP

(75) Inventors: Oliver Gaertner, Abstatt (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 13/990,264

(22) PCT Filed: Oct. 12, 2011

(86) PCT No.: PCT/EP2011/067801
§ 371 (c)(1),
(2), (4) Date: Aug. 16, 2013

(87) PCT Pub. No.: WO2012/072322
PCT Pub. Date: Jun. 7, 2012

(65) Prior Publication Data
US 2013/0330221 A1    Dec. 12, 2013

(30) Foreign Application Priority Data
Nov. 30, 2010   (DE) .................. 10 2010 062 173

(51) Int. Cl.
| | |
|---|---|
| *F16K 15/02* | (2006.01) |
| *F16K 1/46* | (2006.01) |
| *F04B 53/10* | (2006.01) |
| *F16K 1/36* | (2006.01) |
| *F16K 15/06* | (2006.01) |
| *F16K 25/00* | (2006.01) |

(52) U.S. Cl.
CPC ............. *F16K 1/46* (2013.01); *F04B 53/102* (2013.01); *F16K 1/36* (2013.01); *F16K 15/026* (2013.01); *F16K 15/063* (2013.01); *F16K 25/00* (2013.01)

(58) Field of Classification Search
CPC .... F04B 53/1027; F04B 53/102; F16K 1/38; F16K 15/026; F16K 15/063; F16K 25/00; F16K 1/36
USPC ................ 137/536, 538, 540, 543.23
See application file for complete search history.

(56) References Cited

U.S. PATENT DOCUMENTS

| | | | |
|---|---|---|---|
| 1,598,297 A * | 8/1926 | Macnicoll ................. 137/536 |
| 2,011,547 A * | 8/1935 | Campbell ................ 137/516.29 |
| 4,716,924 A | 1/1988 | Pacht | |
| 4,860,995 A * | 8/1989 | Rogers .............. F04B 53/1027 137/516.29 |
| 5,062,452 A * | 11/1991 | Johnson ................. 137/533.25 |
| 6,398,317 B1 | 6/2002 | Burgdorf et al. | |

FOREIGN PATENT DOCUMENTS

| | | |
|---|---|---|
| DE | 41 33 391 A1 | 4/1993 |
| DE | 197 21 774 A1 | 11/1998 |

(Continued)

OTHER PUBLICATIONS

International Search Report corresponding to PCT Application No. PCT/EP2011/067801, mailed Nov. 30, 2011 (German and English language document) (7 pages).

*Primary Examiner* — Kevin Lee
*Assistant Examiner* — P. Macade Nichols
(74) *Attorney, Agent, or Firm* — Maginot, Moore & Beck LLP

(57) ABSTRACT

In a valve, in particular an outlet valve of a hydraulic piston pump for delivering a fluid, includes a valve seat and a valve closing body. A valve orifice is formed in the valve seat, and the valve closing body is arranged on the valve seat. The valve closing body is configured to selectively open and close the valve orifice, and the valve closing body includes a sealing bead which forms a sealing fit with the valve seat when the valve orifice is in the closed state.

7 Claims, 2 Drawing Sheets

(56) References Cited

FOREIGN PATENT DOCUMENTS

| | | |
|---|---|---|
| DE | 10 2004 028 889 A1 | 1/2006 |
| DE | 10 2008 043 841 A1 | 5/2010 |
| EP | 0 022 916 A1 | 5/1980 |
| GB | 2 037 953 A | 7/1980 |
| JP | 48-16419 U | 2/1973 |
| JP | 60-167885 U | 11/1985 |
| JP | 61-49171 U | 4/1986 |
| JP | 11-100750 A | 4/1999 |
| JP | 2000-28010 A | 1/2000 |
| JP | 2001-527484 A | 12/2001 |

\* cited by examiner

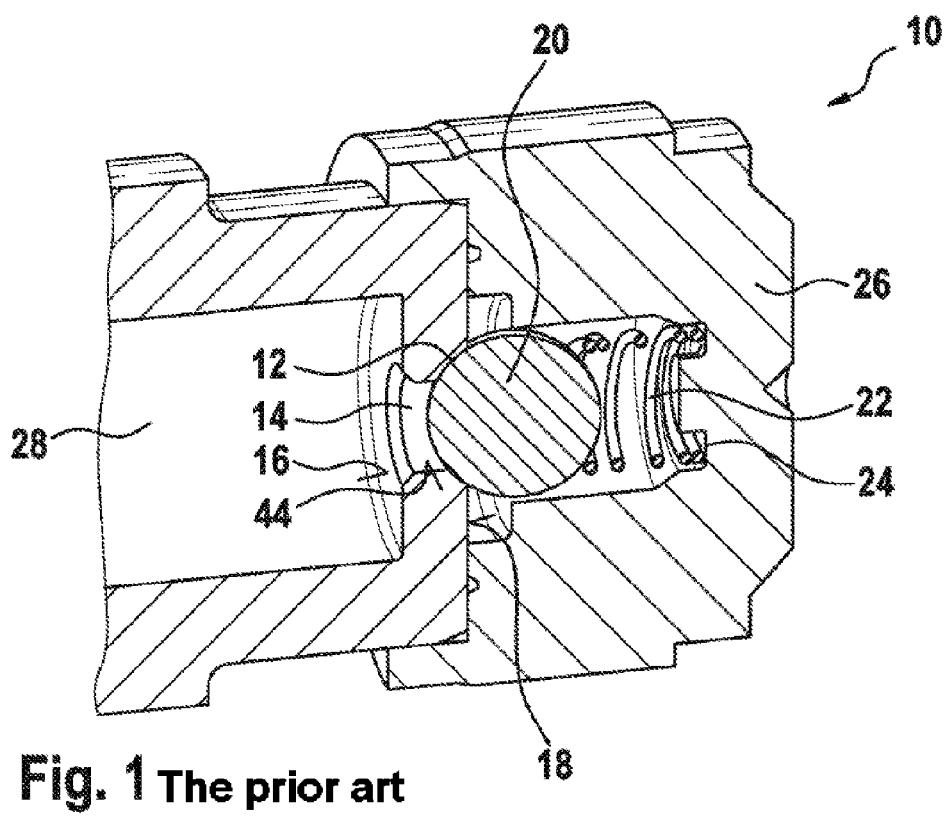
Fig. 1 The prior art
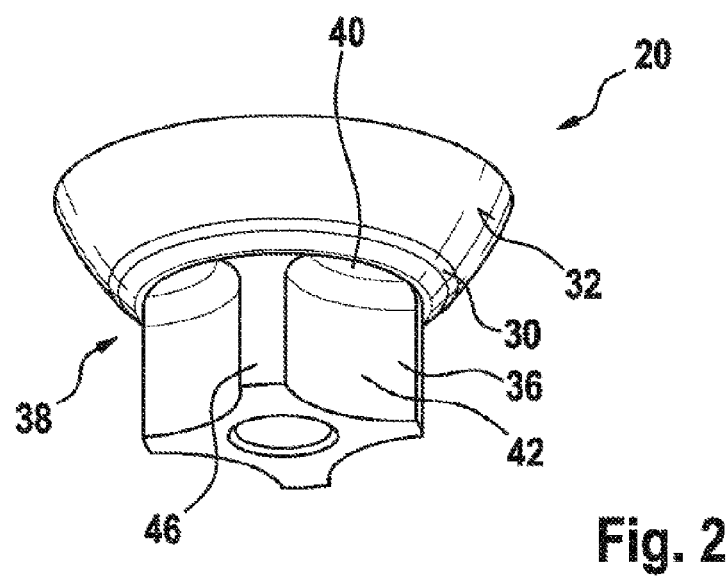
Fig. 2

VALVE, IN PARTICULAR OUTLET VALVE OF A HYDRAULIC PISTON PUMP

This application is a 35 U.S.C. §371 National Stage Application of PCT/EP2011/067801, filed on Oct. 12, 2011, which claims the benefit of priority to Ser. No. DE 10 2010 062 173.0, filed on Nov. 30, 2010 in Germany, the disclosures of which are incorporated herein by reference in their entirety.

BACKGROUND

The disclosure relates to a valve, in particular an outlet valve of a hydraulic piston pump for delivering a fluid, comprising a valve seat in which a valve orifice is formed and a valve closing body which is arranged on the valve seat for selectively opening and closing the valve orifice. The disclosure further relates to a hydraulic piston pump and to a vehicle brake system.

Hydraulic piston pumps, as used, for example, in vehicle brake systems, generally have ball valves as inlet and outlet valves, since these are relatively inexpensive to produce.

Such a valve in the form of a ball valve is usually arranged in a valve housing which is clamped to a mounting of a piston capable of reciprocating in a cylinder. The inlet valve is provided so that fluid can be drawn through an inlet device into a pressure region in the interior of the cylinder by means of a stroke movement of the piston. The fluid is then delivered under pressure through the outlet valve from the pressure region into a hydraulic system in order to perform work.

The valve housing is generally configured as a cup-shaped cage in the interior of which a helical return spring which urges against a spherical closing body is located. The spherical closing body thereby bears against a valve seat which is formed on the end face of the piston.

When the piston is pushed out of the cylinder by means of a return spring, therefore, the closing body of the inlet valve is lifted from the valve seat against the force of the return spring, since a negative pressure is built up in the cylinder. During this movement of the piston the inlet valve is opened and fluid is drawn via the inlet device into the pressure region.

When the piston is pushed into the cylinder by means of a cam the inlet valve closes and the outlet valve is opened, in that the closing body thereof is lifted against a spring force of a helical return spring. The fluid is delivered from the pressure region into a hydraulic system in order to perform work.

DE 10 2008 043 841 A1 discloses a ball valve, in particular a high-pressure valve for high-pressure pumps of fuel injection systems, having a valve ball and a valve seat face, the valve ball cooperating with the valve seat face to form a sealing fit for interrupting a connection between an inlet and an outlet. The valve ball is urged against the valve seat face by means of a helical return spring.

Furthermore, DE 10 2004 028 889 A1 discloses a piston pump for delivering hydraulic fluid, comprising a cylinder element, a piston capable of being moved back and forth in the cylinder element and a piston chamber in which the hydraulic fluid can be pressurized by means of the piston. The piston pump further includes an outlet valve and a slot-controlled inlet valve. In the outlet valve, a valve ball is urged against an associated valve seat as a closing body by means of a disk-shaped return spring.

SUMMARY

According to the disclosure there is provided a valve, in particular an outlet valve of a hydraulic piston pump for delivering a fluid, comprising a valve seat in which a valve orifice is formed and a valve closing body which is arranged on the valve seat for selectively opening and closing the valve orifice, the valve closing body including a sealing bead which forms a sealing fit with the valve seat in the closed state of the valve orifice.

The hydraulic piston pump preferably includes a cylindrical piston which is mounted retractably and extendably in an interior chamber of a cylinder. A pressure region filled with a fluid is provided and sealed in the interior chamber of the cylinder. When the piston is extended from the cylinder a negative pressure is built up in the pressure region and the piston draws fluid into the pressure region via an inlet valve. When being retracted, the piston forces the fluid via an outlet valve from the pressure region into a hydraulic system in order to perform work.

In the present case a fluid should be understood to mean a gas and/or a liquid such as a hydraulic fluid with a mineral oil or glycol base.

The inlet valve and/or outlet valve is advantageously configured as a valve according to the disclosure. The valve according to the disclosure has a valve seat with a valve orifice and a valve closing body. The valve seat includes a front side and a rear side, the rear side of the valve seat being understood here to mean the side on which the fluid flows into the valve orifice, and the front side to mean the side on which the fluid flows out of the valve orifice. The valve closing body is arranged on the front side of the valve seat.

While the piston is being extended from the cylinder, fluid is drawn through the inlet valve into the pressure region as a result of the negative pressure generated. As this happens, the valve closing body is lifted a certain distance from the valve seat and the fluid flows through the valve orifice into the pressure region. The outlet valve is closed in a substantially fluid-tight manner while the piston is being extended from the cylinder.

As the piston is retracted into the cylinder the inlet valve is closed. As a result of the pressure generated in the pressure region, the valve closing body of the outlet valve is lifted and the valve orifice is opened. The fluid then flows from the pressure region along the outlet valve into a hydraulic system in order to perform work.

According to the disclosure the valve closing body includes a sealing bead which forms a sealing fit with the valve seat in the closed state of the valve orifice. This sealing bead is preferably arranged on an outer lateral surface of the valve closing body and is configured to run continuously around the lateral surface. The sealing bead thus forms a closed ring which bears against the valve seat while the remaining part of the valve closing body does not come into contact with the valve seat.

As the valve closing body is urged against the valve seat by means of a restoring means, the sealing bead is pressed against this valve seat, whereby a substantially fluid-tight sealing fit is made available. The valve orifice is occluded.

A space-saving and compact construction or structure, in particular of an outlet valve, in which the closing body occludes the valve orifice reliably and in a substantially fluid-tight manner, is therefore provided.

During the manufacturing process of the hydraulic piston pump, a so-called pneumatic leakage test, in particular a low-pressure test of the valves, is normally carried out as part of a quality assurance process. As a result of the use of the valve according to the disclosure with the sealing bead that has been explained, the fluid-tightness of the piston pump is significantly improved, advantageously reducing a rate of rejection of defective valves on grounds of excessive leakage. The overall production costs of the hydraulic piston pump can thereby be reduced. The sealing quality of the piston pump is improved.

According to an advantageous development of the valve according to the disclosure, the sealing bead is formed as a sealing edge. The sealing edge preferably has a substantially semicircular configuration, viewed in cross section.

According to this embodiment, the sealing bead is configured as a sealing edge running around the outer lateral surface of the valve closing body, especially in the form of an elevation, a circumferential ridge or a thin ring. Such a sealing edge or sealing ridge makes available especially good sealing and an especially fluid-tight sealing fit.

Especially preferably, the sealing bead is of elastic configuration.

In the present case the sealing bead, preferably in the form of a sealing edge, is produced from an elastic material, preferably from an elastic plastics material. During closing of the valve the sealing bead is elastically deformed; that is to say that the sealing bead adapts itself to the contour of the valve seat, making available a high degree of fluid-tightness of the sealing fit.

According to an advantageous development, the valve closing body and the sealing bead are formed in one piece.

Such a so-called valve closing body/sealing bead unit is robust and can be produced at low cost. It is preferably produced as an injection molding. The sealing bead can be made available in a substantially cost-neutral manner if a mold of the sealing bead is already integrated in an injection molding tool or an injection mold.

According to a further useful development of the valve according to the disclosure, the valve closing body is of plate-like or dome-shaped configuration.

Such a valve makes available a plate-like valve closing body which, in comparison to a spherical valve closing body, is of relatively low height or small dimensions. Because of the low height of such a valve closing body, an inlet and/or outlet valve having very little dead volume can be produced, increasing the efficiency of the hydraulic piston pump.

The valve closing body may also optionally be configured as a ball cap, that is, a specific spherical segment or a specific spherical section, or as a hemisphere or a cone.

The valve preferably includes a restoring means on an outflow side of the valve, which loads the valve body with a restoring force urging the valve body against the valve seat.

The outflow side of the valve according to the disclosure is also defined as the front side of the valve or the front side of the valve seat.

The restoring means, preferably in the form of a return spring, may be configured as an elongated spring wire or a flat-wound bending spring such as a spring ring or spring washer, a leaf spring or a spiral spring. The leaf spring preferably consists of a flat metal strip or metal wire which is pretensioned in an arc shape.

The spiral spring is preferably produced from a metal strip or metal wire wound in a spiral shape in a plane. A spiral spring or spring ring can be especially simply installed in the valve. The return spring is preferably produced from a spring steel, for example a copper-beryllium alloy.

This restoring means bears against the valve closing body; that is to say that the restoring means urges the valve closing body with a defined elastic force from the front side of the valve seat towards the valve seat. When a suction or pressure which is greater than the restoring force of the restoring means is applied to valve closing body, the restoring means is deformed as the valve closing body is lifted from the valve seat in proportion to the distance traveled by the valve closing body. The valve closing body is therefore loaded with a restoring force so that it closes rapidly and easily while forming a substantially fluid-tight closure—the sealing fit—by means of the sealing bead.

According to a further advantageous development of the valve according to the disclosure, the valve closing body includes a guide means extending into the valve orifice in order to guide the valve closing body relative to the valve seat.

According to such a development, the valve includes a guide means which is arranged in the valve orifice and is connected to the valve closing body. This guide means positions the valve closing body on the valve seat; that is, during the opening and closing of the valve it guides the valve closing body on a defined path. During the closing of the valve the guide means guides the valve closing body, in particular, to a predefined position on the valve seat where the sealing bead of the valve closing body forms a substantially fluid-tight closure with the valve seat, by means of the sealing fit.

For this purpose the guide means is preferably in the form of an elongated shoulder or section arranged on an end face of the valve closing body oriented towards the valve orifice. This elongated shoulder is received in the interior of the valve orifice.

The valve closing body and the guide means are preferably formed in one piece as an injection molding.

According to a further development, the guide means has at least one fluid-conducting recess and at least one region which can come into abutment against an inner wall of the valve orifice in order to guide the valve closing body.

The guide means has at least one region which rests against an inner wall of the valve orifice in order to guide the valve closing body. At least one further region—a fluid-conducting recess—is spaced from the inner wall of the valve orifice, enabling the fluid to flow through the valve orifice between the inner wall of the valve orifice and the outer wall of the guide means when the valve closing body is lifted. The valve guide means is therefore divided into at least two regions, firstly a region which rests against the inner wall of the valve orifice and therefore effects precise guidance of the valve closing body in the axial and radial directions, and secondly a recessed region which —in the case of an outlet valve—makes available a fluid-conducting connection between a compression chamber, that is the pressure region, and a high-pressure side, that is the hydraulic system.

The at least one region for guiding the valve closing body is preferably formed as a land or rib which rests axially against the inner wall of the valve orifice. The guide means comprises, in particular two to six, preferably four lands or ribs which are spaced substantially uniformly from one another and are arranged alternately with the fluid-guiding recesses.

The object of the disclosure is further achieved by means of a hydraulic piston pump having a valve according to the disclosure.

The hydraulic piston pump according to the disclosure includes a cylinder and a piston mounted in the cylinder and able to move reciprocatingly therein. A pressure region filled with a fluid is formed in the interior chamber of the cylinder. As the piston is extended from the cylinder a negative pressure is built up in the pressure region and the piston draws fluid into the pressure region via an inlet valve. As the piston is retracted, by contrast, it forces the fluid via an outlet valve from the pressure region into a hydraulic system in order to perform work.

The inlet and/or outlet valve is advantageously in the form of a valve according to the disclosure having the above-mentioned features and advantages. A valve of this type ensures, firstly, a high degree of robustness and good sealing behavior. In particular, an improvement in sealing quality in a pneumatic leakage test during production of the valves can be achieved. The rejection rate of valves which do not pass the leakage test is thereby reduced so that overall production costs can be reduced.

Finally, a vehicle brake system including a hydraulic piston pump according to the disclosure is made available.

The vehicle brake system according to the disclosure includes a hydraulic piston pump having a valve according to the disclosure which has the features and advantages explained above.

Such a vehicle brake system may be, for example, an antilock system (ABS), a traction control system (TCS), an electronic stability program (ESP) or an electrohydraulic brake system (EHB). With such systems it is especially advantageous if the hydraulic piston pumps have robust valves which at the same time are inexpensive to produce, which ensure high fluid-tightness and make available optimum functioning of the brake system combined with long service life.

BRIEF DESCRIPTION OF THE DRAWINGS

An exemplary embodiment of the solution according to the disclosure is explained in more detail below with reference to the appended drawings, in which:

FIG. 1 shows a longitudinal section through an outlet valve of a hydraulic piston pump according to the prior art;

FIG. 2 is a view of a valve closing body with a sealing bead according to the disclosure;

DETAILED DESCRIPTION

Figure 3:
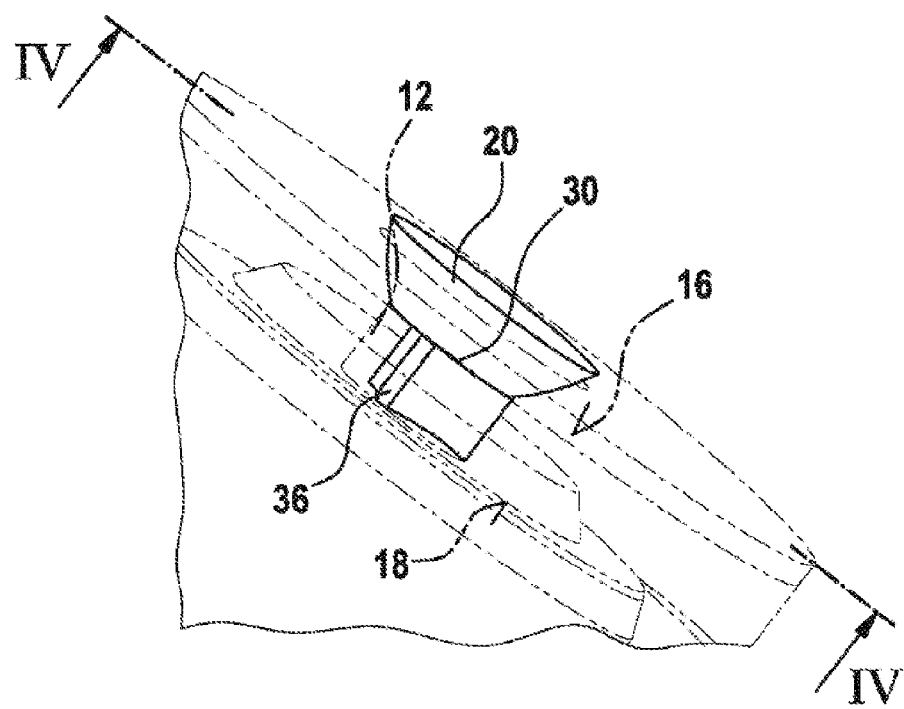
FIG. 3 is a view of a valve according to the disclosure.

FIG. 1 shows an outlet valve 10 of a hydraulic piston pump according to the state of the art. The valve 10 comprises a valve seat 12 through which a substantially circular valve orifice 14 passes.

The valve seat 12 has a front side 16 and a rear side 18, the rear side 18 being defined as the side on which the fluid, in the present case a brake fluid, flows into the valve orifice 14, and the front side 16 as the side on which the fluid flows out of the valve orifice 14.

The valve 10 further comprises a spherical valve closing body 20 which is arranged on the front side 18 of the valve seat 12, that is, on the outflow side, for selectively opening and closing the valve orifice 14.

The valve closing body 20 is loaded by means of a restoring means 22, in the present case a spiral spring, with a restoring force which urges the valve closing body 20 against the front side 18 of the valve seat 12. The restoring means 22 is arranged on the outflow side 18 of the valve 10 and therefore exerts a compressive force on the valve closing body 20. In this case the restoring means 22 is positioned on a side of the valve closing body 20 facing away from the valve orifice 14 and is retained on a shoulder 24 of a valve cover 26.

If the pressure exerted on the valve closing body 20 is greater than the restoring force of the restoring means 22, the valve closing body 20 is lifted from the valve seat 12 and the fluid is conducted into a hydraulic system—on the so-called high-pressure side—in order to perform work. The outlet valve 10 therefore separates a compression chamber 28 of the hydraulic piston pump from the high-pressure side.

FIG. 2 shows a valve closing body 20 according to the disclosure with a sealing bead 30. This valve closing body 20 is associated with the outlet valve 10 of the hydraulic piston pump according to FIG. 1. The hydraulic piston pump is integrated in a vehicle brake system. FIG. 3 shows the valve closing body 20 as it is associated with the valve seat 12.

The valve closing body 20 is substantially hemispherical or dome-shaped, since such a valve closing body 20 requires, in particular, a small installation space in the piston pump. Other geometries are, however, possible, such as, for example, plate-shaped or conical valve closing bodies 20.

The sealing bead 30 in the form of an elastically formed elevation or sealing edge is arranged around a lateral surface 32 of the valve closing body 20 which narrows conically towards the valve orifice 14 and is at the same time slightly convex. Viewed in cross-section, the elevation is substantially a more or less flattened semicircle.

Figure 4:
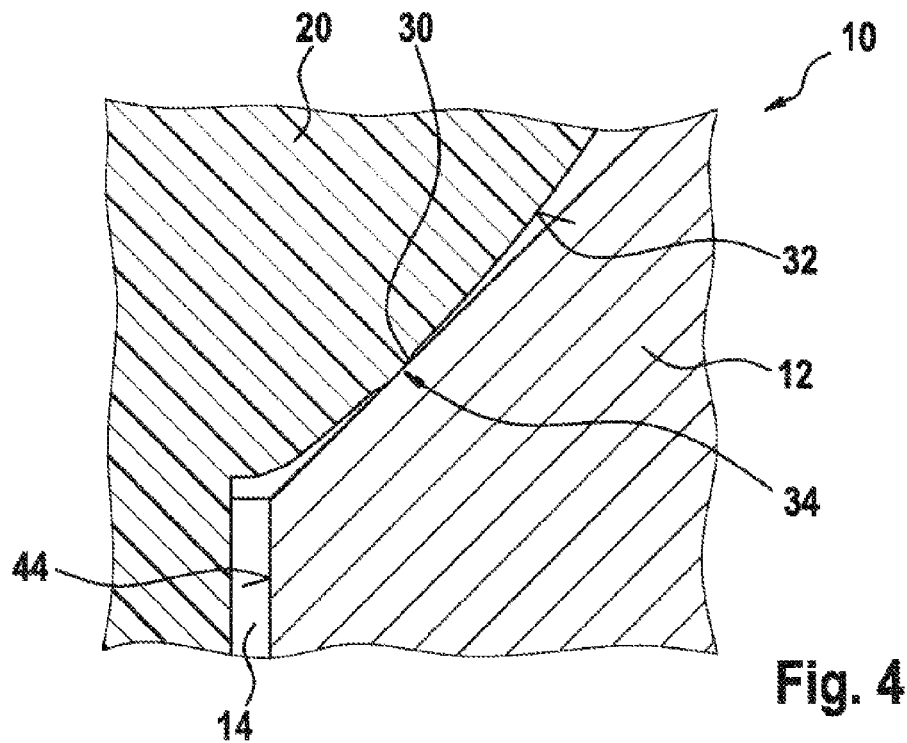
FIG. 4 shows the section IV-IV in FIG. 3 in an enlarged representation.

In the closed state of the valve 10, that is, when the restoring means 22 exerts a restoring force on the valve closing body 20 and the latter bears against the valve seat 12, the sealing bead 30 forms with the valve seat 12 a fluid-tight sealing fit 34 (cf. FIG. 4). The valve orifice 14 is therefore closed in a fluid-tight manner.

During a closing process of the valve 10, the sealing bead 30 or the sealing edge is deformed as a result of its relatively small size and elastic property, adapting itself to the contour of the valve seat 12. High fluid-tightness of the valve 10 is thereby ensured.

A pneumatic leakage test in the context of quality control of the hydraulic piston pump of this type and of the valve 10 during the manufacturing process has revealed that fluid-tightness is significantly improved. In particular, the sealing bead 30 performs very positively in a low-pressure test. The rejection rate of defective valves 10 on grounds of excessive leakage is reduced, whereby production costs are lowered.

The valve closing body 20 with the fine circumferential sealing bead 30 around it further includes a guide means 36 which forms together with the valve closing body 20 a valve closing body/guide means unit 38. This valve closing body/guide means unit 38 is molded integrally as a plastics injection molding.

When the valve closing body/guide means unit 38 is fitted into the valve 10 (cf. FIG. 3), the guide means 36 extends into the valve orifice 14 and guides the valve closing body 20 relative to the valve seat 12 during the opening and closing of the valve 10.

For this purpose the guide means 36 is in the form of a cylindrical projection 40 which begins at the end face of the valve closing body 20 oriented towards the valve orifice 14 and extends into the valve orifice 14. The guide means 36 is received in the valve orifice 14 in such a way that it is spaced from an inner wall 44 of the valve orifice 14 with four fluid-conducting recesses 42. By contrast, four regions 46 arranged alternately with the fluid-conducting recesses 42 rest against the inner wall 44 of the valve orifice 14.

These regions 46 are provided in order to guide the valve closing body 20 in the axial and radial directions during opening and closing thereof and to position it precisely on the valve seat 12. The valve closing body 20 is guided on a defined path. Because of such guidance of the valve closing body 20, undesired deflection of the valve closing body 20 is prevented.

When the valve closing body 20 is lifted from the valve seat 12, the fluid flows along the fluid-conducting recesses 42 through the valve 10.

The areas 46 for guiding the valve closing body 20, which rest against the inner wall 44 of the valve orifice 14, are in the present case formed as four lands 46 spaced substantially uniformly with respect to one another and extending in the axial direction. During the opening and closing of the valve 10, these lands 46 therefore slide in the longitudinal extension of the valve orifice 14 past the inner wall 44 thereof.

A low-cost and robust valve 10, which ensures a good sealing effect combined with light, rapid and precise closing behavior and which can be integrated simply in a hydraulic piston pump, is provided. The sealing bead 30 or the sealing edge ensures high pneumatic fluid-tightness of the valve 10. Furthermore, the valve closing body/guide means unit 38 is of compact construction, ensuring a space-saving configuration of the valve 10.

It should be noted in conclusion that all the features mentioned in the application documents should receive independent protection, both individually and in any combination, despite being formally related to one or more particular embodiments.

The invention claimed is:

1. A valve, comprising:
a valve seat having a seat face and an orifice face, the orifice face defining a valve orifice extending through the valve seat, the seat face intersecting the orifice face at the valve orifice; and
a valve closing body arranged on the valve seat and configured to selectively open and close the valve orifice,
wherein the valve closing body has (i) an outer lateral surface that faces the seat face and that narrows conically towards the valve orifice and (ii) an elastic sealing bead formed integrally with the outer lateral surface and configured to directly contact the seat face so as to form a sealing fit with the seat face when the valve orifice is in a closed state,
wherein the elastic sealing bead runs continuously around the outer lateral surface and forms a closed ring that bears against the seat face,
wherein the valve closing body includes a guide mechanism configured to extend into the valve orifice to guide the valve closing body relative to the valve seat,
wherein the valve closing body has one of a plate-like configuration and a dome-shaped configuration,
wherein the guide mechanism has at least one fluid-conducting recess and at least one region configured to rest against the orifice face to guide the valve closing body, and
wherein the at least one fluid-conducting recess and the at least one region are arranged on the guide mechanism such that the at least one fluid-conducting recess and the at least one region overlap along at least one plane disposed perpendicular to a direction of movement of the valve closing body within the valve orifice.

2. A hydraulic piston pump, comprising:
a valve including:
a valve seat having a seat face and an orifice face, the orifice face defining a valve orifice extending through the valve seat, the seat face intersecting the orifice face at the valve orifice; and
a valve closing body arranged on the valve seat and configured to selectively open and close the valve orifice,
wherein the valve closing body has (i) an outer lateral surface that faces the seat face and that narrows conically towards the valve orifice and (ii) an elastic sealing bead formed integrally with the outer lateral surface and configured to directly contact the seat face so as to form a sealing fit with the seat face when the valve orifice is in a closed state, and
wherein the elastic sealing bead runs continuously around the outer lateral surface and forms a closed ring that bears against the seat face.

3. The hydraulic piston pump as claimed in claim 2, wherein the sealing bead is configured as a sealing edge.

4. The hydraulic piston pump as claimed in claim 2, wherein the valve closing body includes a guide mechanism configured to extend into the valve orifice to guide the valve closing body relative to the valve seat.

5. The hydraulic piston pump as claimed in claim 2, further comprising a restoring mechanism arranged on an outflow side of the valve and configured to load the valve closing body with a restoring force to urge the valve closing body against the valve seat.

6. The hydraulic piston pump as claimed in claim 2, wherein the valve closing body has one of a plate-like configuration and a dome-shaped configuration.

7. A vehicle brake system, comprising:
a hydraulic piston pump including:
a valve having:
a valve seat having a seat face and an orifice face, the orifice face defining a valve orifice extending through the valve seat, the seat face intersecting the orifice face at the valve orifice; and
a valve closing body arranged on the valve seat and configured to selectively open and close the valve orifice,
wherein the valve closing body has (i) an outer lateral surface that faces the seat face and that narrows conically towards the valve orifice and (ii) an elastic sealing bead formed integrally with the outer lateral surface and configured to directly contact the seat face so as to form a sealing fit with the seat face when the valve orifice is in a closed state, and
wherein the elastic sealing bead runs continuously around the outer lateral surface and forms a closed ring that bears against the seat face.

* * * * *